(12) United States Patent
Hill et al.

(10) Patent No.: US 6,870,535 B2
(45) Date of Patent: Mar. 22, 2005

(54) FONT ARCHITECTURE AND CREATION TOOL FOR PRODUCING RICHER TEXT

(75) Inventors: Gerard Anthony Hill, Castle Hill (AU); Cameron Bolitho Browne, Burleigh Heads (AU); Paul Quentin Scott, Pymble (AU); Timothy Merrick Long, Lindfield (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/153,077

(22) Filed: Sep. 15, 1998

(65) Prior Publication Data
US 2002/0130871 A1 Sep. 19, 2002

(30) Foreign Application Priority Data

Sep. 15, 1997 (AU) .............................. PO9187
Oct. 1, 1997 (AU) .............................. PO9566

(51) Int. Cl.$^7$ ......................... G06F 13/00; G06T 11/00; G06T 11/20
(52) U.S. Cl. ...................... 345/467; 345/441; 345/470; 345/418
(58) Field of Search ................................ 345/467, 418, 345/619, 630, 441–443, 468, 470, 472, 472.3, 440, 471, 133, 141, 142, 469, 144, 170; 382/181–182, 185, 198, 203, 229, 112, 187, 189; 707/8, 10, 529, 542

(56) References Cited

U.S. PATENT DOCUMENTS

| | | | |
|---|---|---|---|
| 4,610,025 A | * 9/1986 | Blum et al. | 382/9 |
| 5,412,771 A | 5/1995 | Fenwick | 395/150 |
| 5,416,898 A | * 5/1995 | Opstad | 345/471 |
| 5,526,477 A | * 6/1996 | McConnell | 345/467 |
| 5,533,174 A | 7/1996 | Flowers, Jr. et al. | 395/114 |
| 5,544,288 A | * 8/1996 | Morgan | 345/467 |
| 5,577,177 A | * 11/1996 | Collins et al. | 345/469 |
| 5,583,978 A | * 12/1996 | Collins | 345/170 |

(List continued on next page.)

FOREIGN PATENT DOCUMENTS

| | | | |
|---|---|---|---|
| EP | 0745952 | 12/1996 | |
| EP | 0902378 A2 | * 3/1999 | G06F/17/21 |

OTHER PUBLICATIONS

T. Porter et al., Compositing Digital Images, Computer Graphics, vol. 18, No. 3, Jul. 1984, pp. 253–259.
"CorelDRAW Benutzerhandbuch—Version 4.0", Corel Corporation (1993).

*Primary Examiner*—Matthew C. Bella
*Assistant Examiner*—Wesner Sajous
(74) *Attorney, Agent, or Firm*—Fitzpatrick, Cella, Harper & Scinto

(57) ABSTRACT

A method of creating a series of font characters (101) on a computer system (150) is disclosed. A series of font outlines (111) and source artwork (112); a series of manipulation tools (116) for the manipulation of aspects of the outlines and artwork. Such an arrangement provides for the creation of substantially arbitrarily complex font structures from the outlines, artwork and manipulation tools. A series of font characters is then formed through the application of the complex font structures to each of a base font outline in the series of font characters. Preferably, the complex font structures can comprise a graphical expression tree of operations (120) to be performed in the creation of a font and the tree includes an outline of a font character. The manipulation tools can include tools for distorting, replacing or compositing the outline of a font and can further include the tools for the application of morphological and non-morphological effects to the font outlines. A data structure for such font creation is also disclosed which includes records (90–97) of attributes of glyphs used to form the outlines including their shape, color, opacity and where appropriate compositing or blending with graphic object or pixel-based images.

40 Claims, 14 Drawing Sheets

U.S. PATENT DOCUMENTS

| | | | | |
|---|---|---|---|---|
| 5,586,241 A | * | 12/1996 | Bauermeister | 345/170 |
| 5,687,331 A | * | 11/1997 | Volk et al. | 345/716 |
| 5,706,364 A | * | 1/1998 | Kopec | 382/159 |
| 5,754,187 A | * | 5/1998 | Ristow | 345/469 |
| 5,771,034 A | * | 6/1998 | Gibson | 345/141 |
| 5,781,714 A | * | 7/1998 | Collins | 345/471 |
| 5,920,880 A | * | 7/1999 | Dowdy | 345/433 |
| 5,926,189 A | * | 7/1999 | Beaman et al. | 345/467 |
| 5,949,438 A | * | 9/1999 | Cyman | 345/467 |
| 5,956,419 A | * | 9/1999 | Kopec | 345/467 |
| 5,966,637 A | * | 10/1999 | Kanungo | 348/10 |
| 6,057,858 A | * | 5/2000 | Desrosiers | 345/467 |
| 6,065,008 A | * | 5/2000 | Simmon et al. | 707/10 |
| 6,141,002 A | * | 10/2000 | Kanungo et al. | 348/10 |
| 6,504,545 B1 | * | 1/2003 | Browne et al. | 345/473 |

* cited by examiner

FONT ARCHITECTURE AND CREATION TOOL FOR PRODUCING RICHER TEXT

FIELD OF THE INVENTION

The present invention relates to the field of digital image processing and, in particular, to the creation of images having characters or text in them so as to produce enhanced or superior resulting image fonts. A tool for creating fonts having appealing artistic characteristics is also disclosed.

BACKGROUND OF THE INVENTION

Recently, it has become more and more popular to create complex images through the utilisation of a computer system having a high resolution graphics display and a high resolution output printer preferably of a color form. The graphic image production industry is undergoing a rapid development and complex and sophisticated image production tools such as Adobe Photoshop (Trade Mark) are often utilised for the creation of complex images.

One important aesthetic quality of most images is a character font which conveys text. The design of character fonts is a complex process requiring sophisticated artistic judgements made by the designer. Traditionally, a font has consisted of a bitmap or an outline, the later typically being represented by spline data. The utilisation of font outlines often provides greater flexibility in scaling operations in that the one font can be defined for many different sizes by means of re-scaling of the spline data. Various designed fonts have become extremely popular, for example, Times New Roman, Courier etc.

Although fonts are well known and utilised in computer image generation programs such as word processing programs, or higher end graphics programs, they are generally lacking in one or more of flexibility, creativity and structure. As the user of the font must work within the pre-defined structure, this often leads to limited or blinkered artistic output results.

When designing a font, it is necessary to produce designs for each and every character within a font set. This is a laborious and time consuming task, even for the Roman character set, and the languages to which it applies. Further, when designing fonts for other languages, the number of characters within a character set can be extremely large (for example, kanji characters) and hence significant work, labour and expense is involved in the creation of font characters.

It follows that there is a need to provide a flexible and adaptable font structure which leads to increased levels of flexibility and utilisation. It is also desirable for the font creation process to be substantially automated, whilst still maintaining substantial artistic control over each character, thereby reducing the graphic designer's workload.

SUMMARY OF THE INVENTION

It is an object of the present invention to substantially overcome, or at least ameliorate, one or more deficiencies in the existing arrangements.

In accordance with a first embodiment of the present invention there is provided a method of incorporating characters from a font into a document or displaying them on a display medium, said font containing a plurality of glyphs, each glyph comprising one or more shapes, natural or synthesized images, or other glyphs, said method comprising the steps of:

(a) extracting a description of one or more glyphs from the font; and (b) rendering the characters onto a display medium or including them as part of a document description.

In accordance with a second embodiment of the present invention there is provided a font structure for use in an image creation system comprising a series of characters wherein each character is made up of a customizable glyph structure, said glyph structure further comprising a series of graphical objects which can be composited together in a predetermined order.

In accordance with a third embodiment of the present invention, there is provided a method of creating a series of font characters on a computer system comprising providing a series of font outlines and source artwork; providing a series of manipulation tools for the manipulation of aspects of the outlines and artwork; providing for the creation of substantially arbitrarily complex font structures from the outlines, artwork and manipulation tools; and creating the series of font characters through the application of the complex font structures to each of a base font outline in the series of font characters.

Preferably, the complex font structures can comprise a graphical expression tree of operations to be performed in the creation of a font and the tree includes an outline of a font character. The manipulation tools can include tools for distorting, replacing or compositing the outline of a font and can further include the tools for the application of morphological and non-morphological effects to the font outlines. This includes graphical effects that are applied to a set of character outlines, while maintaining the font's readability.

Preferably, font outlines are:

(1) derived from existing fonts (e.g. True Type);

(2) generated automatically from letter-form primitives; or (3) drawn by artists.

BRIEF DESCRIPTION OF THE DRAWINGS

Notwithstanding any other forms which may fall within the scope of the present invention, a number of embodiments of the present invention will now be described, by way of example only, with reference to the accompanying drawings in which.

DESCRIPTION OF PREFERRED AND OTHER EMBODIMENTS

Font Architecture

In the present embodiment, a font is represented by a series of character "glyphs"; a glyph being a sculptured character or symbol. The glyphs have a complex structure which allows their utilisation in the creation of images having much more complex characteristics.

Figure 1:
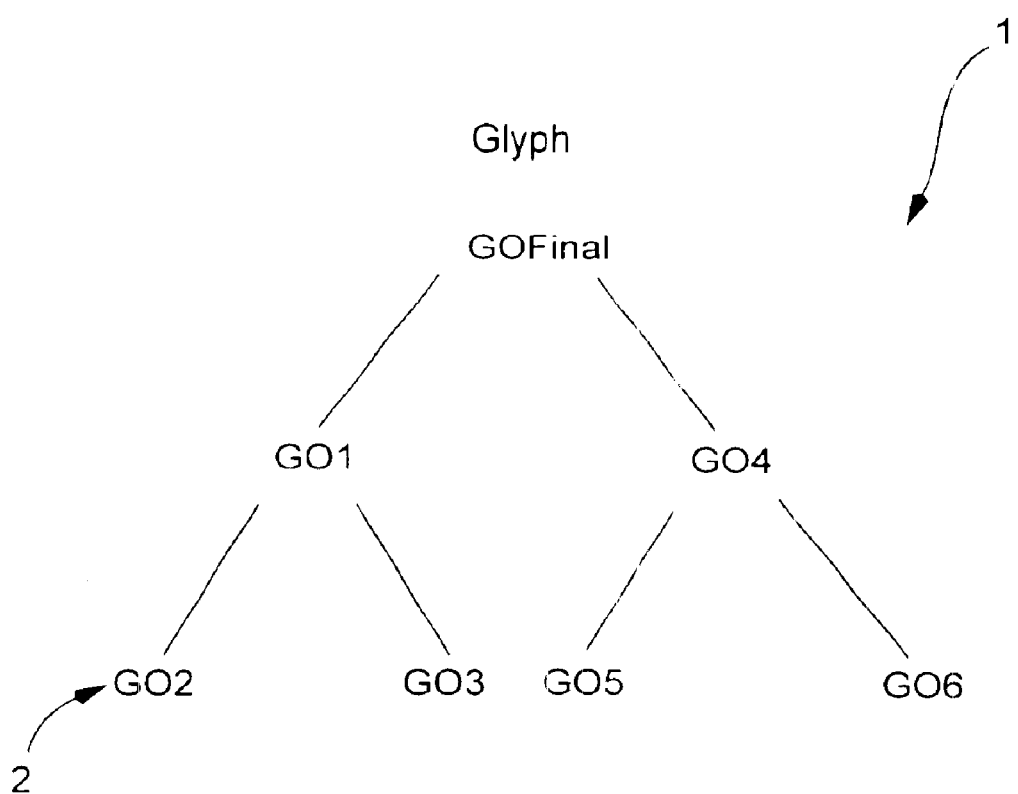
FIG. 1 illustrates the structure of a character glyph utilising a first embodiment.

Turning now to FIG. 1, there is illustrated schematically the structure of a single glyph 1 of a font according to the present embodiment. In storage, each glyph 1 has a corresponding glyph index number (hereinafter glyph index) utilised to reference the overall glyph. If necessary, there may be one or more character codes or characters which map to a particular glyph index. Hence, the unit of access of characters in the preferred embodiment is by glyph number. The glyph 1 is a description of the visual appearance of a character and is composed of one or more graphical objects 2 which together form a tree structure seen in FIG. 1 describing the appearance of the character corresponding to the glyph index. Such a tree structure describing the appearance of a character is sometimes referred to herein as a graphic object (GOB) tree.

Figure 2:
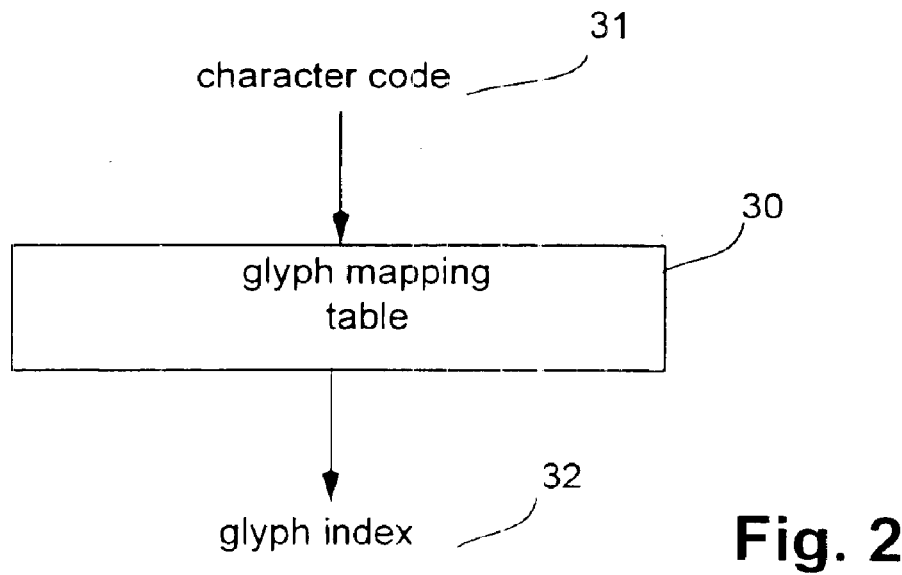
FIG. 2 illustrates the process of deriving a glyph index from a character code.

In FIG. 2, there is illustrated a mapping 30 of a character code 31 to a corresponding glyph index 32 which is carried out utilising a Glyph Mapping Table 30.

Each graphical object 2 typically includes various information components used in the reproduction of the glyph or font. Examples of such components include Primitives, Attributes of primitives, Operators and Selection.

Primitives can be formed in a number of ways and are used to characterise an object shape. For example cubic spline paths may be used to define the shape of objects (including character paths). Alternatively, image data in the form of pixel maps (which may or may not be in a compressed format), may define the entire shape.

Attributes of primitives include various items that provide character and appeal to a primitive.

Figure 3:
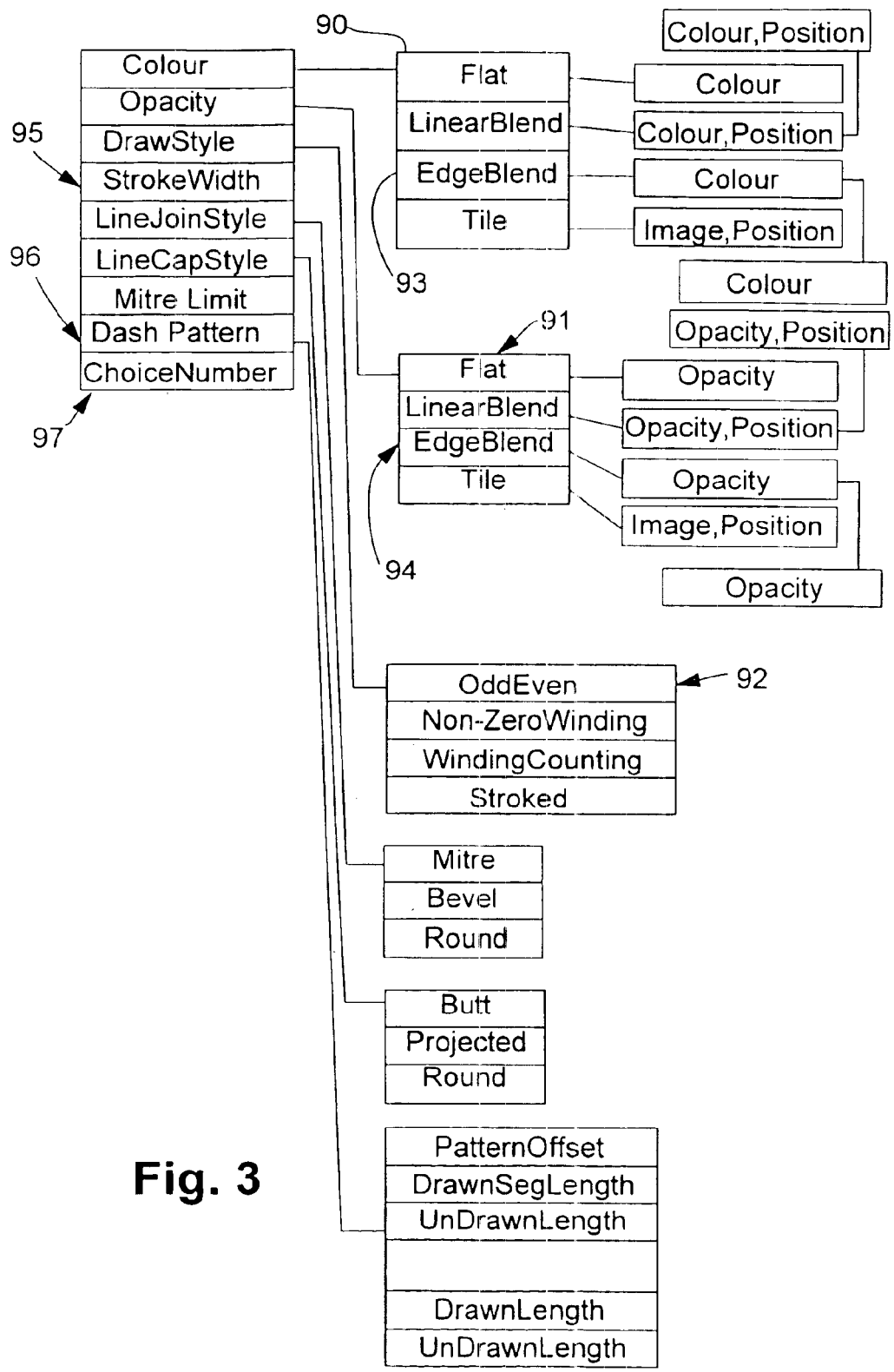
FIG. 3 illustrates a layout of the Graphics Context Attributes.

FIG. 3 illustrates a layout of Graphic Context Attributes, which attributes can include:

color and color blend information 90;

opacity and opacity blend information 91;

edge blends of the edges of objects eg. 93,94;

one or more transformation matrices (not illustrated) to be applied to paths and images; and draw style 92 and stroking parameters for paths 95,96.

Binary Operators are used together for the compositing together of two or more graphical objects. These can include OVER, IN, OUT, ATOP, XOR, PLUSC, PLUSW and are discussed in the well known article, "Compositing Digital Images", Porter, T; Duff, T; *Computer Graphics* Vol. 18 No. 3, July 1984, pages 253–259. Other compositing operators include NOT-XOR, PLUS, MINUS, AND, NAND, OR, NOR, NOT, CLEAR, SET, and COPY Selection provides a choice of attached graphic objects based on the present environment state.

It will be evident that any primitive utilised in a graphics object can be greatly parameterised. This means that the corresponding feature can be referred to by altering a parameter in the graphics context and having the resulting value changed when the character is used. The decision to allow objects and features to be parameterised provides great flexibility in the hands of the font designer in the creation of complex fonts. A default value is preferably provided for each feature that is parameterised.

Returning to FIG. 1, graphics object having a selection choice can form a node (eg. G01) of the GOB tree and such provides a method for selecting an object from a group of descendant graphics objects (eg. G02, G03) provided with the font, depending on a desired graphical context. The selection can be achieved in conjunction with any parameters in the graphics context. An example of the selection process is described below with reference to FIG. 6.

Parameters in primitives can be used as groups of settings to be combined to achieve a particular effect. In order to take advantage of this, the font as noted above may include a section for attributes. The attribute section contains parameter settings that can be transferred to the graphics context upon a user request.

Attributes in a glyph that can be affected (see FIG. 3) can include:

colour;

opacity;

draw style;

stroke width;

line join style;

line cap style;

mitre limit;

dash pattern; and choice number.

Figure 9:
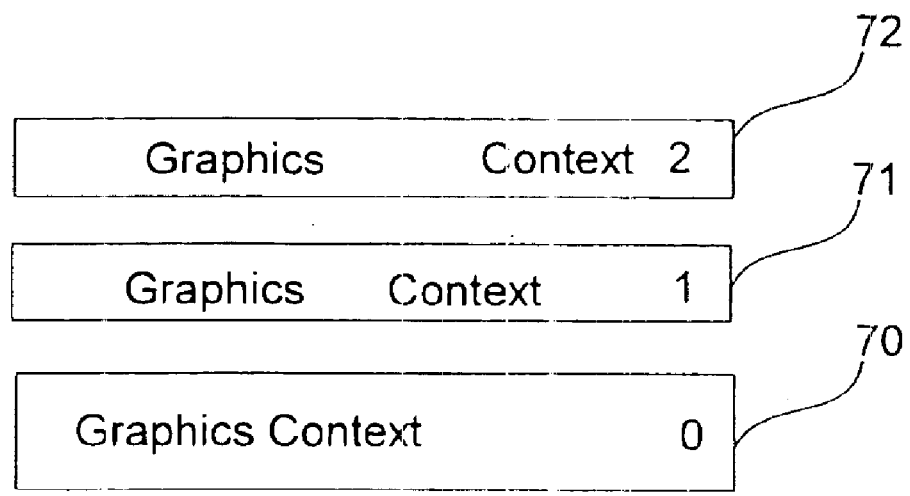
FIG. 9 illustrates multiple graphics contexts.

All color and opacity values can preferably be parameterised across a whole font. This means that only a few colours need to be chosen to make a whole font appear color matched and there is freedom for a font designer to use different parameters for each character if this is required. Each unique color value to be parametered can be taken from a different graphics context number (GC number) as shown in FIG. 9.

Figure 4:
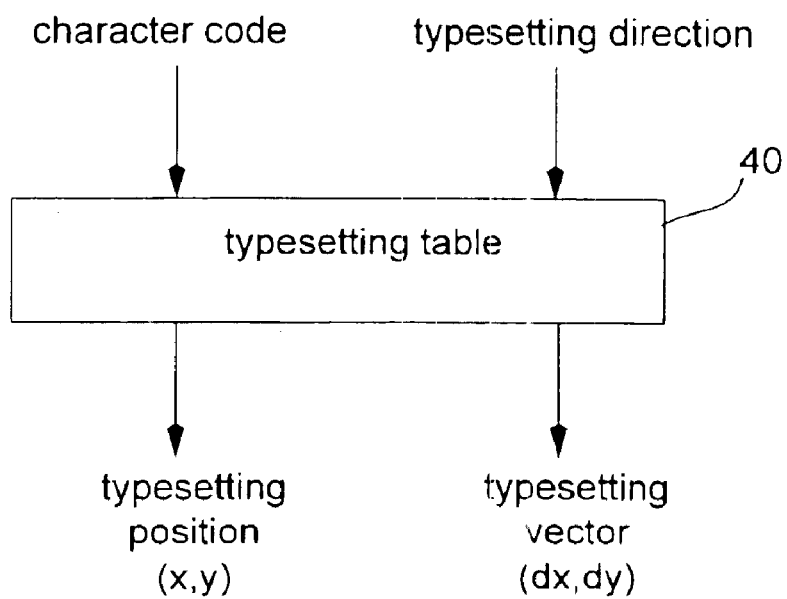
FIG. 4 illustrates the usage of typesetting information.

As shown in FIG. 4, each glyph 1 can have typesetting information 40 for its vertical and horizontal typesetting directions taken from a font file. For example, the following can be provided:

horizontal typesetting position (x, y);

horizontal typesetting vector (dx, dy);

vertical typesetting position (x, y); and vertical typesetting vector (dx, dy).

Through the utilization of the glyph structure 1 of FIG. 1, arbitrarily complex font structures can be created. A font can be produced which contains vastly more information than a traditional font and it therefore allows for much more detail in its appearance. However, traditional font characters can also be readily stored as glyph graphical objects so there is flexibility to make them as simple or as complex as is required.

The glyph structure can therefore be adapted to be similar in operation to a conventional font so that it can be used interchangeably. The extensions to a graphics language which allow the user to control aspects of the appearance of characters in a glyph structure are purely optional.

The user is then able to customise the appearance of the resulting glyph characters to obtain a desired appearance.

Each font has a default "appearance" and the font designer can include arbitrary customisable parameters to allow the user to alter the default appearance to a custom appearance.

Figure 5:
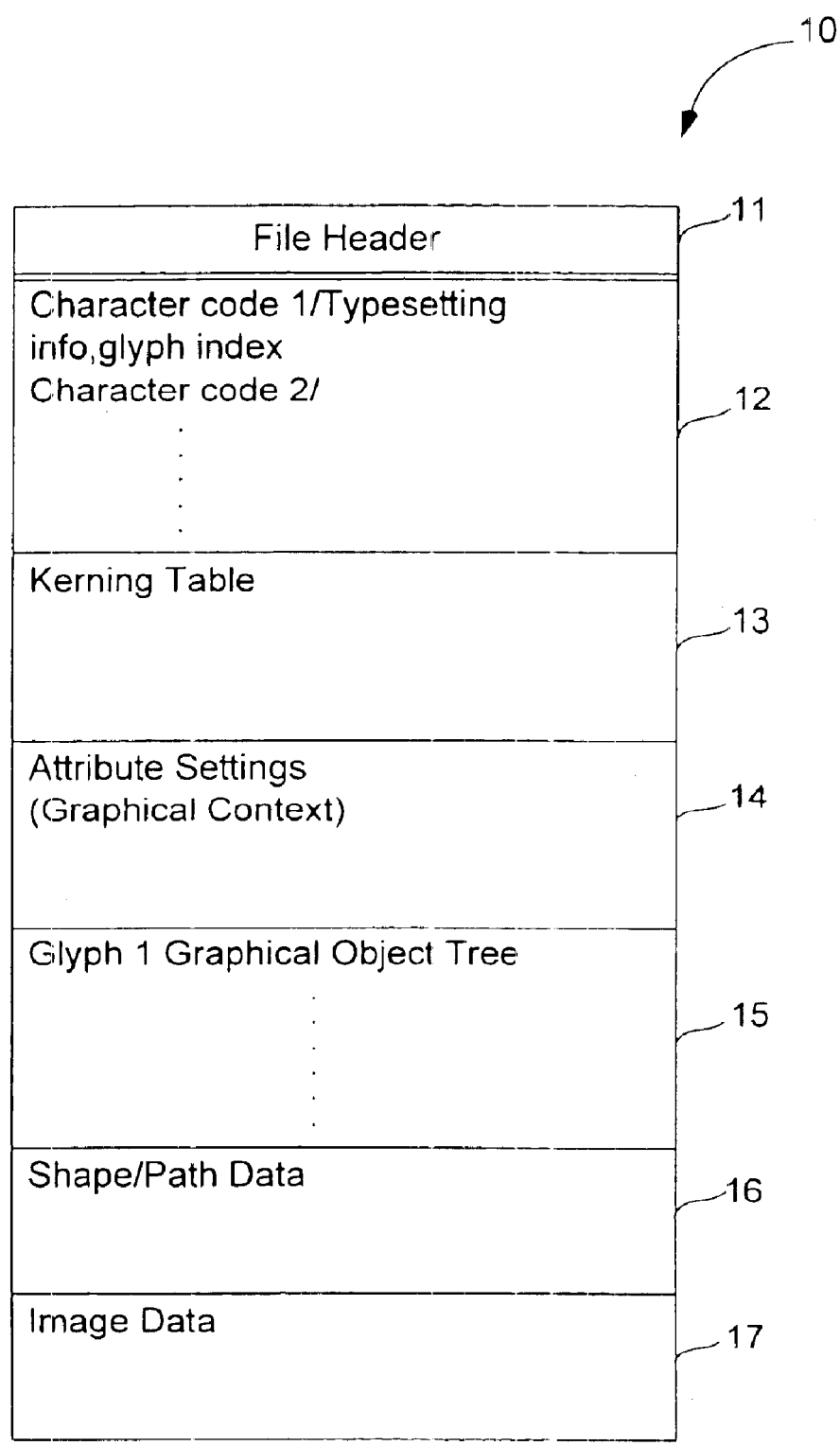
FIG. 5 illustrates the file structure for storage of fonts in accordance with the principles of the first embodiment.

A font can therefore be created from glyphs 1 and stored in a "font file" 10 as shown in FIG. 5 which may contain the following elements:
- font header 11;
- character code, glyph index and typesetting information 12 for each character;
- Kerning table 13;
- Graphics Context attribute settings 14 for the Graphics Context of the Font;
- Tree structures 15 (or GOB trees) of graphical objects for each glyph including pointers to shape 16 and image data 17;
- Shape data 16; and
- Image data 17.

Figure 6:
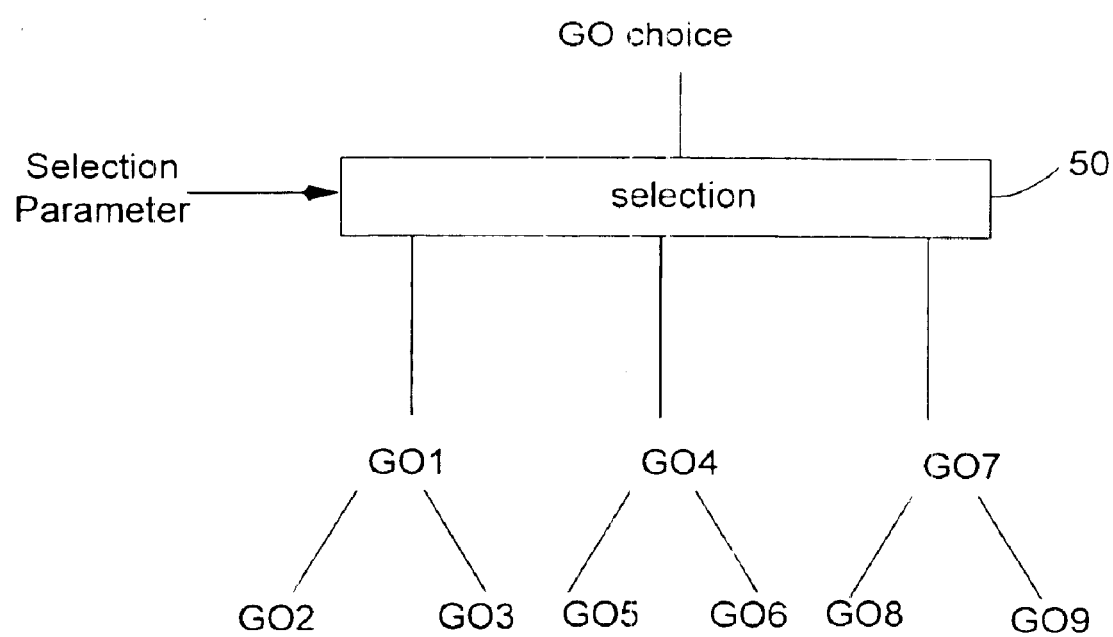
FIG. 6 illustrate the process of GOB tree selection.

The structure of a font from the user's point of view is as a collection of graphic objects 2, of which there are at least one per glyph 1. The graphic objects 2 can contain elements that are used in other graphic objects. Further mechanisms can be provided for altering the appearance of a graphic object by altering the Graphics Context attributes 14. As illustrated in FIG. 6, by changing the choice number and utilising the selection parameter in selection mechanism 50, it is possible to obtain a wide variety of appearances for a single character. Customisation of parameters associated with the glyph can further give the font a unique appearance.

Figure 7:
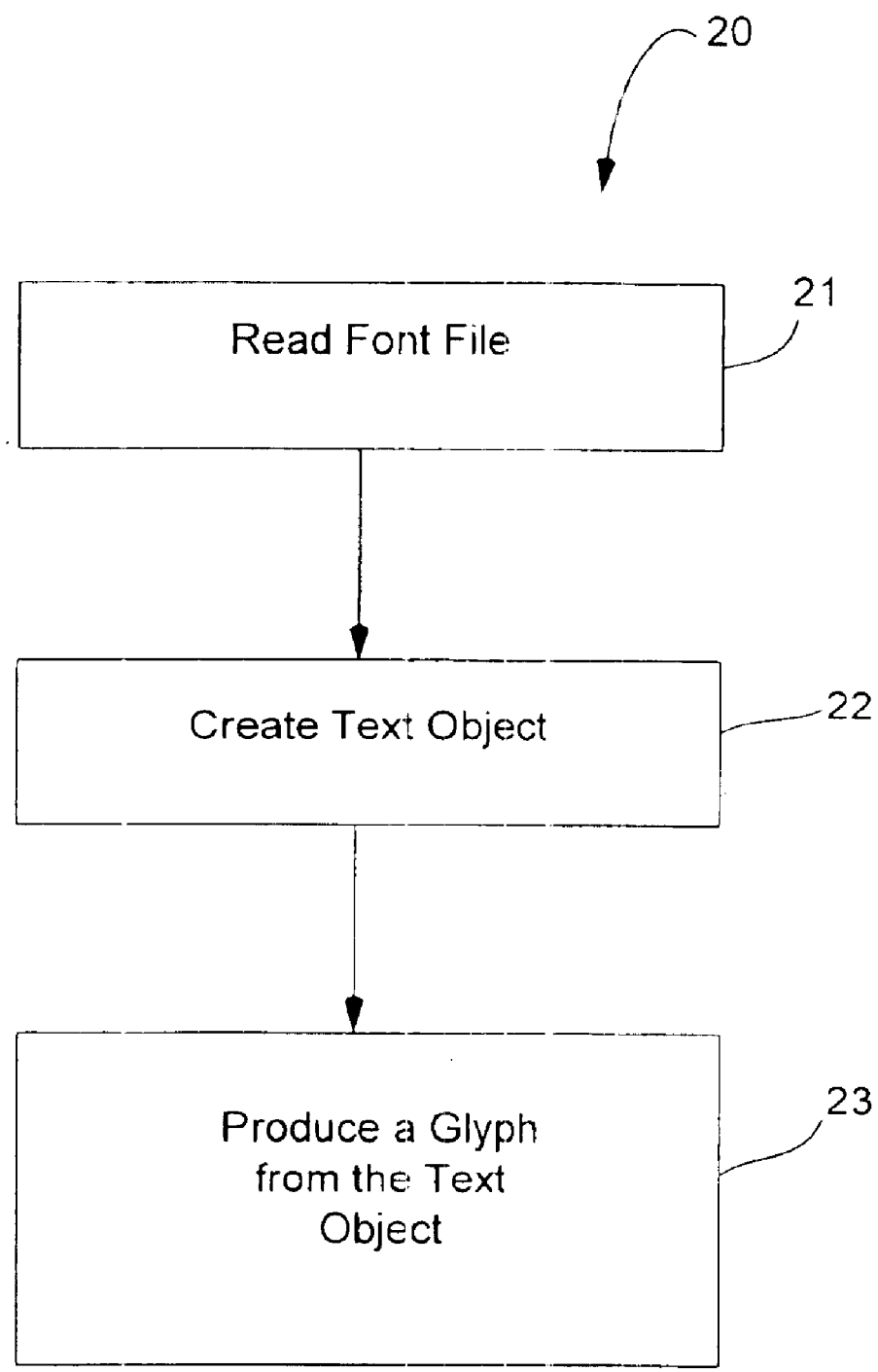
FIG. 7 illustrates a flow diagram of the steps in accessing a font character in accordance with the first embodiment.

FIG. 7 shows a process 20 that is implemented to process a font character in accordance with the present embodiment. The process 20 includes the steps of reading the font file 21, creating 22 a text object referring to the correct character, and producing a corresponding glyph 23 from the text object.

When the font file is read it can be converted to an internal representation, for example a "cached" version, and the cached version of the font can be utilised.

Figure 8:
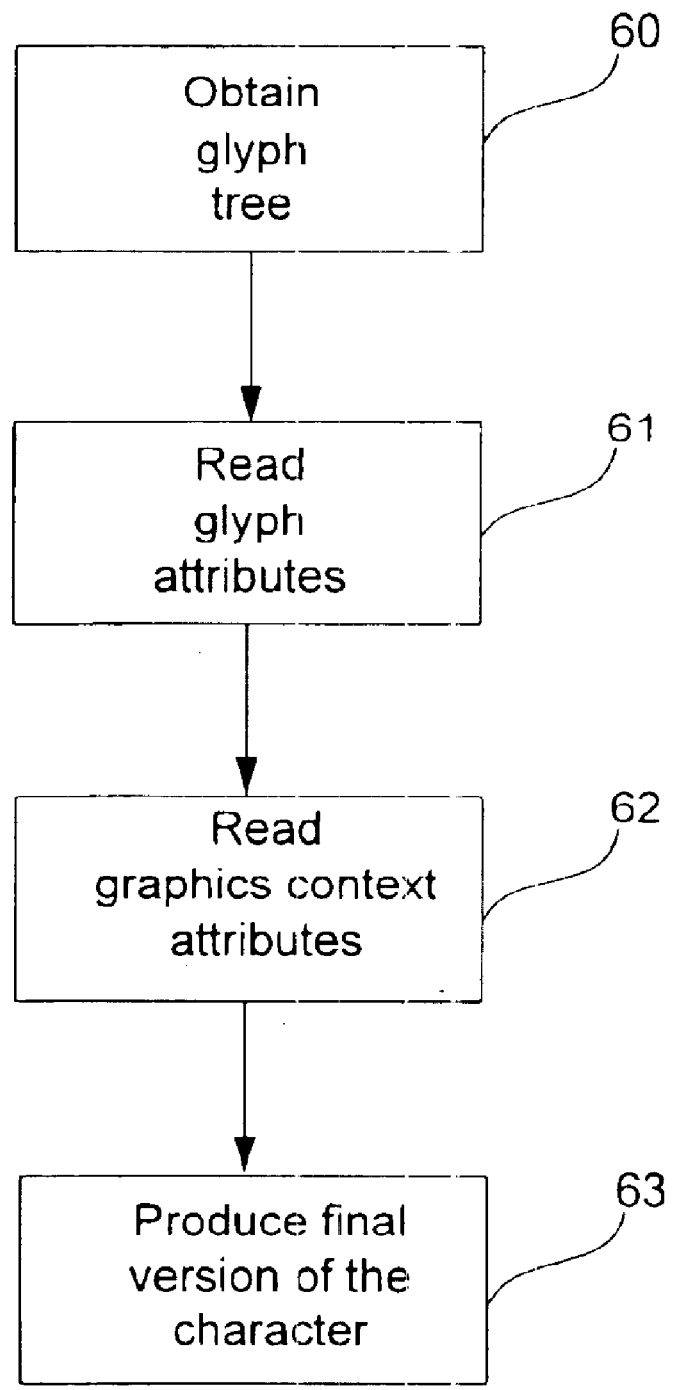
FIG. 8 illustrates the process of producing a final character.

FIG. 8 illustrates the formation of a graphic object resulting from processing a GOB tree for each character. Graphical objects can contain fully defined instances of characters and are accessed at step 60 where a glyph tree is obtained. In step 61, all of the aspects of the appearance of the character(s) are fixed which permits the glyph attributes to be read. Conversion to a final graphical object at step 63 involves applying in step 62 the read graphics context attributes to all parameters. This stage is where the user can exercise control over the appearance of characters.

Figure 10:
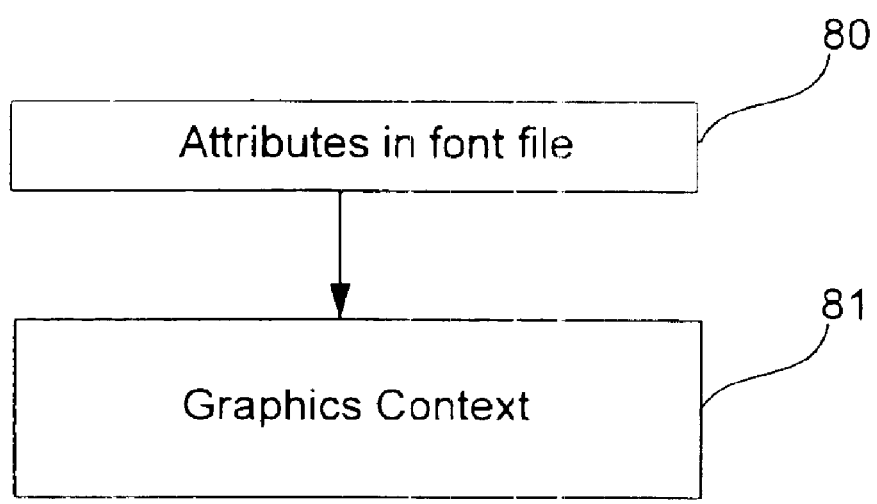
FIG. 10 illustrates setting attributes of a graphics context.

One of the important features of the present font architecture is that the font appearance can be customised by the user of the font. The way this can be achieved is by setting the attributes in the graphics context (FIG. 3). Further, as illustrated in FIG. 9, the graphics context can be extended so that it has multiple instances 70–72, rather than just one. Each instance can be referred to by a graphics context number (GC number). These can have all of the possible attributes available for the font and can be used to customise characters in the font. The attributes at any GC number are initialised by setting them up at the base level of the graphics context (GC number 0) 70 and then copying them to the new GC number. Alternatively, the attributes can be loaded from attributes in the font file as shown in FIG. 10. A graphics context at any GC number can be copied back to the base level. For example, the following commands can be used to support graphics context numbers:

1. gc_copy("attr-name",gcnum) or
    gc_copy("attr-name",gcnum1,gcnum2).

This command is used to copy an attribute (attr-name) from the graphics context number zero (gcnum0 (70)) to the number specified. In the second case, the attribute is copied from gcnum2 (72) to gcnum1 (71).

2. gc_swap("attr-name",gcnum) or
    gc_swap("attr-name",gcnum1,gcnum2).

This command is used to swap an attribute (attr-name) from the graphics context number zero with the number specified. In the second case the attribute is swapped between gcnum1 and gcnum2.

3. gc_load_font_defaults( ).

As illustrated in FIG. 10, the gc_load_font_defaults command is used to set the attributes in the graphics context 81 from the defaults in the font 80. In this case the attributes are typically loaded from the font file.

4. gc_clear( ).

The gc_clear command is used to clear all of the graphics contexts except for gcnum0.

Choice Number

An attribute described with reference to FIG. 3 and included in the graphics context attributes is the choice number attribute 97. The choice number attribute 97 can be read during the processing of a font character file of FIG. 10. The choice number attribute is preferably a numeric value. The commands that affect choice number can include:

gc_choice_num(option). This command sets the choice number for GC number zero 70 to the (numeric) value specified. If the value specified is zero then this can be considered to be the default font option.

option=gc_choice_num( ). This command returns the value of the choice number for GC number zero 70.

It can be seen from the foregoing description that a system of font creation is provided which offers substantially greater flexibility than that known in the prior art, and provides for arbitrarily complex font structures. The font structures can be readily adaptable or amendable by the font creator or the font and user in accordance with requirements.

Font Creation Tool

In this embodiment, a tool is provided for the creation of sophisticated fonts which allow for the creation of a structure from which fonts can be derived.

Although the principles of the instant embodiment have general applicability, and are in particular applicable to "bit map" generated end fonts, the instant embodiment preferably utilises the font architecture system described above. Of course, it is possible to create a font set for other characters utilising other complex image creation packages such as Photoshop, especially when macro languages are utilised within such packages.

Figure 11:
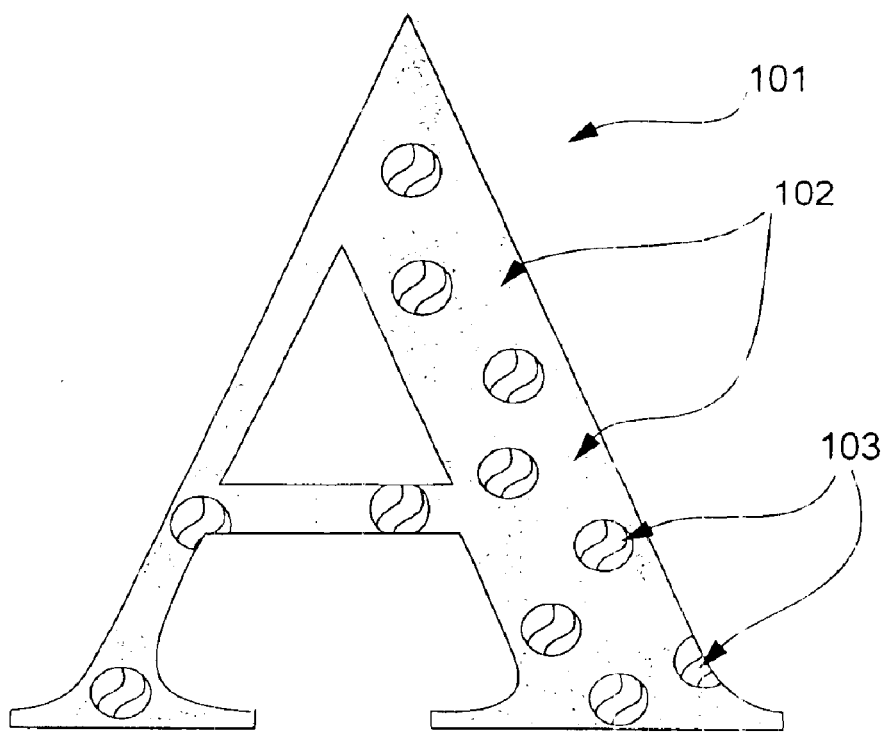
FIG. 11 illustrates an example font having interesting characteristic.

Turning initially to FIG. 11, there is shown an example of a complex font comprising the Times Roman character font "A" 101 which has been manipulated so as to contain within its border a complex image structure comprising a background image 102 on top of which is placed a series of round ball like objects 103.

Figure 12:
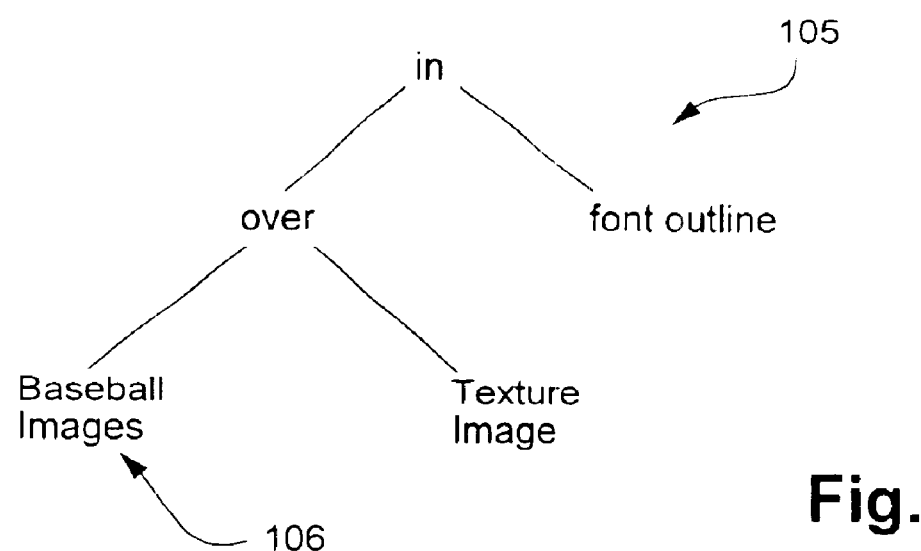
FIG. 12 illustrates an example gob tree structure for the font of FIG. 11.

FIG. 12, shows a corresponding "graphical object tree" (GOB) 105 that might be created in accordance with the principles of the aforementioned specification corresponding for creating the font character 101. The expression tree 105 includes a number of operators having operands which, together, are composited to create a final font. The compositing process can be performed in real time or rendered off line, depending on requirements. Amendments may be made to any part of the GOB tree 5. For example, it may be desirable to provide for the user to select which ball object 106 is placed within the font character 1 depending on requirements. Hence the ball object 106 could comprise a clip art and could be selected from a list of different ball objects (a baseball for example) depending on the font creation characteristics required.

Figure 13:
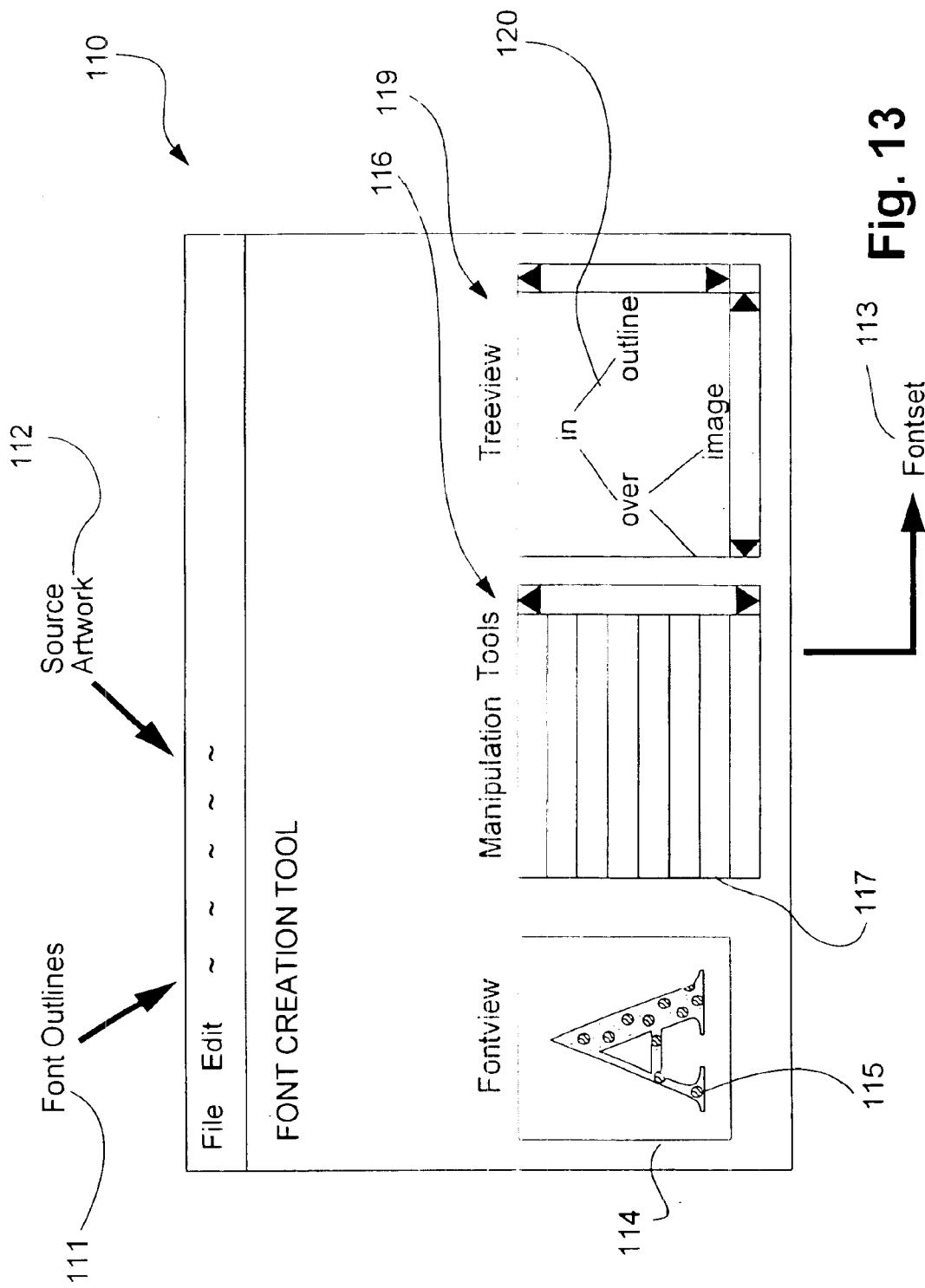
FIG. 13 illustrates an example user interface of a second embodiment.

Turning now to FIG. 13, there is illustrated one form of user interface for a font creation tool 110 as constructed in accordance with the instant embodiment. The font creation tool 110 can be implemented utilising standard software development tools such as Microsoft Visual C++ Developer's environment. The font creation tool 110 takes, as its input, font outlines which can be in the form of standard true type outlines 111 in addition to source artwork which can comprise images and clip art. The output of the font creation tool is a font set 113 which can correspond to a character set in accordance with requirements. Alternatively, for example, a full Unicode character set output can be provided. The font creation tool 110 is based around a user interface which includes a window 114 for viewing sample end fonts 115. The fonts are manipulated by a series of manipulation tools 116 which can be accessed via a user interface list 117. The accessing of items in the list 117 can result in a pop up window for the setting of manipulation tool variables in accordance with requirements. Additionally, a tree view panel 119 can be provided for the display and manipulation of GOB trees 120. Additional user interfaces (not shown) can be provided for the manipulation of the elements within the tree view 119 for the creation of arbitrary trees so as to construct alternative font arrangements.

Through the provision of a large range of manipulation tools 116, each tool having a number of independent variables which can be set, in addition to the creation of arbitrarily complex GOB tree structures, a means can be provided for the creation of a large number of font structures with the rapid testing of the independent variables so as to provide for the most suitable end results, in which sample font is displayed in the font view window 114 for immediate appraisal. Of course, the user interface of the preferred embodiment can be readily adaptable and malleable in accordance with changing requirements and added developments.

Ideally, the font character outline is utilised in, at least, one portion of the tree view 119. Hence, an output font set 113 can be created by means of substitution of the outline pass within the GOB tree 120 for each character so as to produce a corresponding output character.

Figure 14:
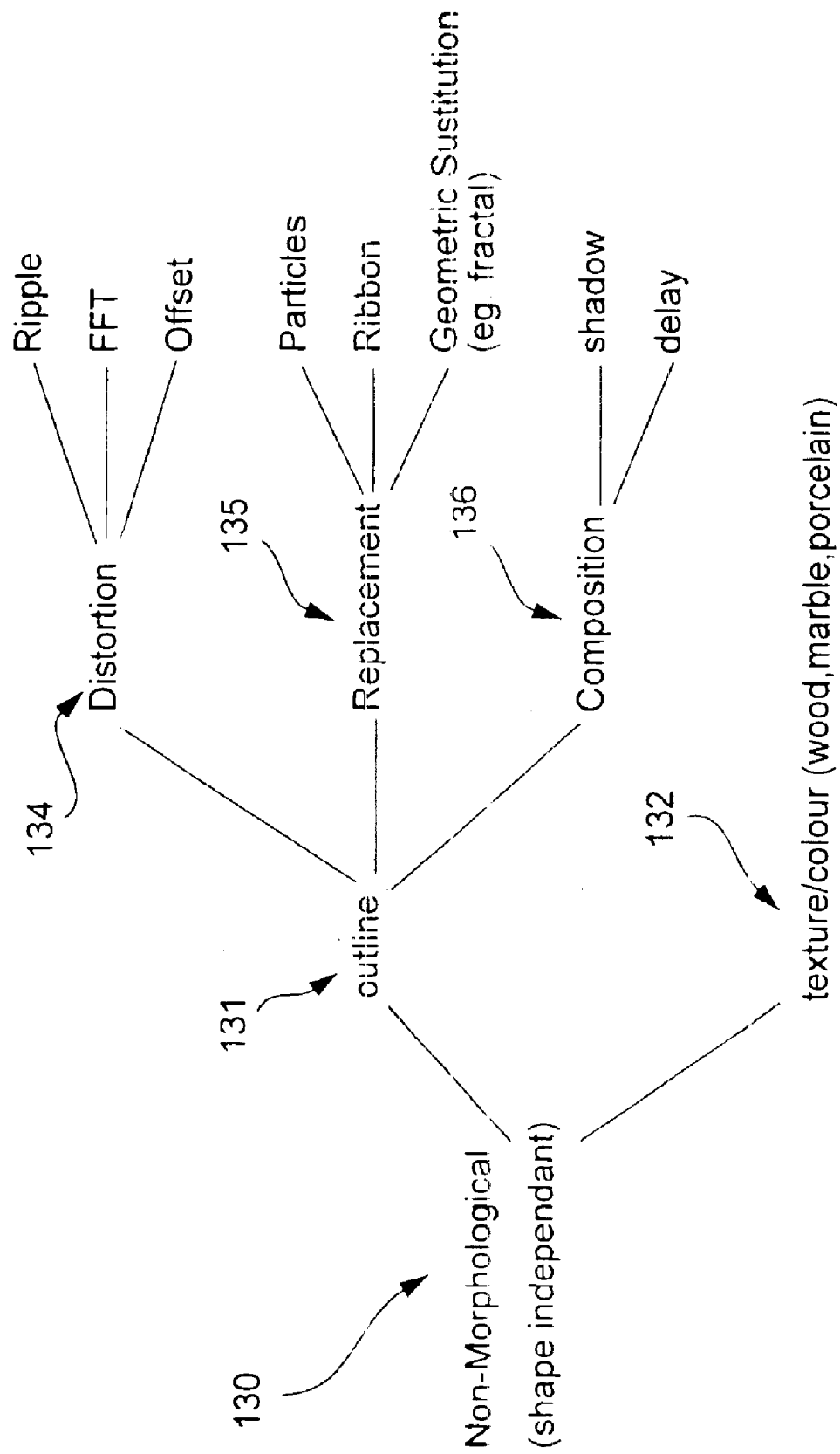
FIGS. 14 and 15 illustrate example categories for the construction of manipulation tools in accordance with the second embodiment.
Figure 15:
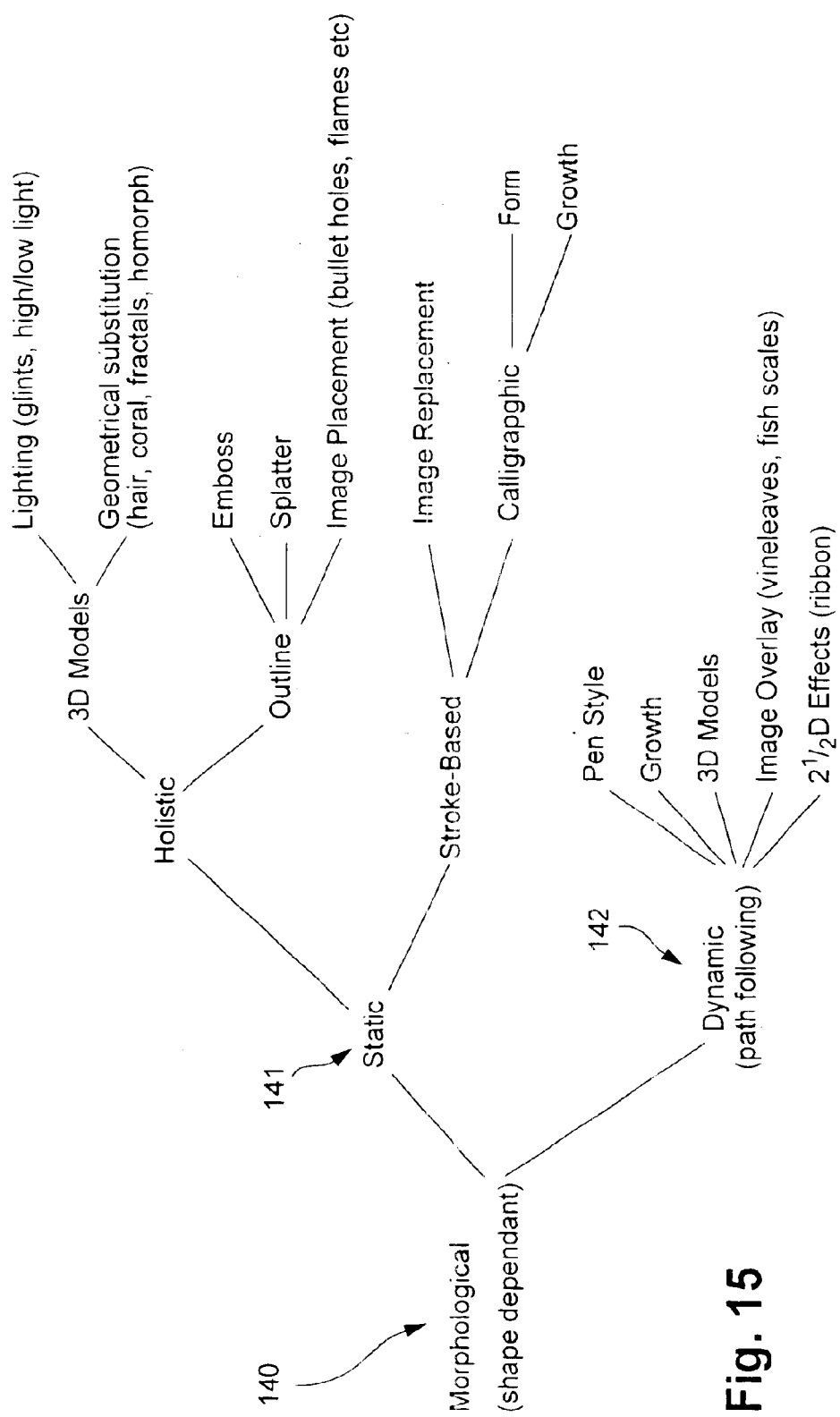

The manipulation tools 116 can be many and various. The manipulation tools 116 can be divided into those which are non morphological (shape independent) and those which are morphological (shape dependant). Graphs of the subject groupings under each of these two categories is illustrated in FIGS. 14 and 15. In FIG. 14, there is illustrated the non morphological categories 130 which can be further divided into operations applied to the outline 131 of a font in addition to those applied to the texture or color of a font 132. The outline modifications can include distortions 134 such as applying outline ripples, altering the Fourier components or offsetting the fonts outlines. Replacement 135 can include such things as replacing the font outline with a series of structure such as particles or ribbons or applying a geometric substitution to the outline. Further, composition of the outline 136 can comprise operations such as shadows and delay functions. Texture or color operations 132 can include the selection of a substantial range of textures and colors for a particular font.

Turning now to FIG. 15, there is illustrated an example graph of the categories of morphological operations 140 which can be applied to a font. These can include both static operations 141 and dynamic operations 142. The static operations 141 are shown divided into holistic and stroke based operations. The holistic operations can include the application of three dimensional models to a font and the application of outline algorithms to a font. The stroked based operations can include image replacement and calligraphic operations. The dynamic operations 142 can be applied to the pen style, the structure of growths on the font, 3D models of a font, image overlays and any 2½ dimensional effects such as ribbons etc.

The outline of categories of FIG. 14 and FIG. 15 merely represents some of the manipulations that can be applied to a font so as to produce interesting effects. Further, the manipulations can be applied to sub-parts of a font and can be utilised in the construction of the GOB expressions tree representing the font.

It will therefore be evident to those skilled in the art that through the utilisation of an interface similar to that depicted schematically in FIG. 13, extremely complex and interesting effects can be built up and tested on sample characters before the subsequent creation of a complete font set. The utilisation of the GOB tree structure also allows for the creation of arbitrary complex graphical images which can then be suitably utilised in font creations.

Figure 16:
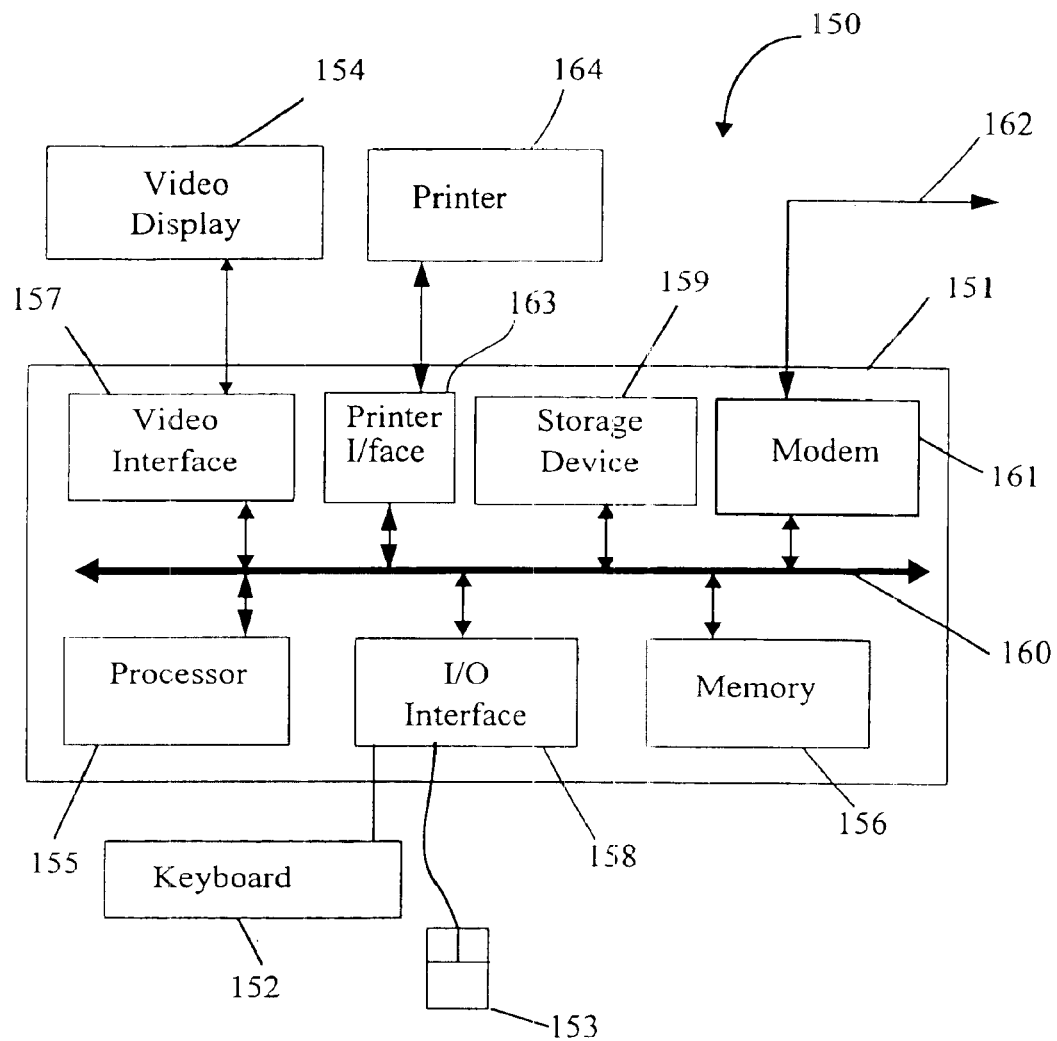
FIG. 16 is a schematic block diagram of a computer system in which the various embodiments of the present invention may be implemented.

The various embodiments of the present invention may be practiced using a personal computer system 150 such as that shown in FIG. 16. The computer system 150 includes a computer module 151, a video display monitor 154 and one or more input devices such as a mouse pointing device 153 and a keyboard 152, connected to the computer module 151. The computer system 150 may be connected to one or more other computers, a computer network such as a LAN, WAN or the Internet, using a communication link 162 and an associated modem device 161, typically but not necessarily arranged within the computer module 151. Further, any of several types of hard copy reproduction output devices 164, including plotters, printers, laser printers, may be connected to the computer module 151 via an appropriate interface 163.

The computer module 155 has one or more central processing units (CPU or processor) 155, a memory module 156 including volatile random access memory (RAM), static RAM or cache and read-only memory (ROM), and an input/output (I/O) interface 158 connected to the input devices 152, 153. Storage device(s) 159 provide for non-volatile storage of data and a video interface/adaptor 157 connects to the video display monitor 154 to provide video signals from the computer module 151 for display on the video display monitor 154. The storage device(s) 159 may comprise one or more of a floppy disc, a hard disc drive, a magneto-optical disc drive, magnetic tape, CD-ROM and/or any other of a number of non-volatile storage devices. The components 155 to 159 and 161 shown in FIG. 16 are coupled to each other via a bus 160 typically including data, address, and control buses and interact to operate in a substantially conventional manner corresponding to known systems such as the IBM PC/AT or compatible arrangements, one of the Apple Macintosh (TM) family of computers, Sun Sparcstation (TM), or the like. The overall structure and individual components of the computer system 150 is essentially conventional and would be well known to persons skilled in the art. Thus, the system 150 is simply provided for illustrative purposes and other configurations can be employed without departing from the scope and spirit of the invention.

The preferred embodiments typically operate as software running on the computer system 150 and incorporate a series of instructions typically resident in the storage device 159

(eg. hard disk) but normally operative from the RAM 156. The software may alternatively be sourced from the computer network and is operative under user control to vary character fonts interactively using the display monitor 154 and for reproduction purposes on the display monitor 154 or via the printer 164.

Figure 17:
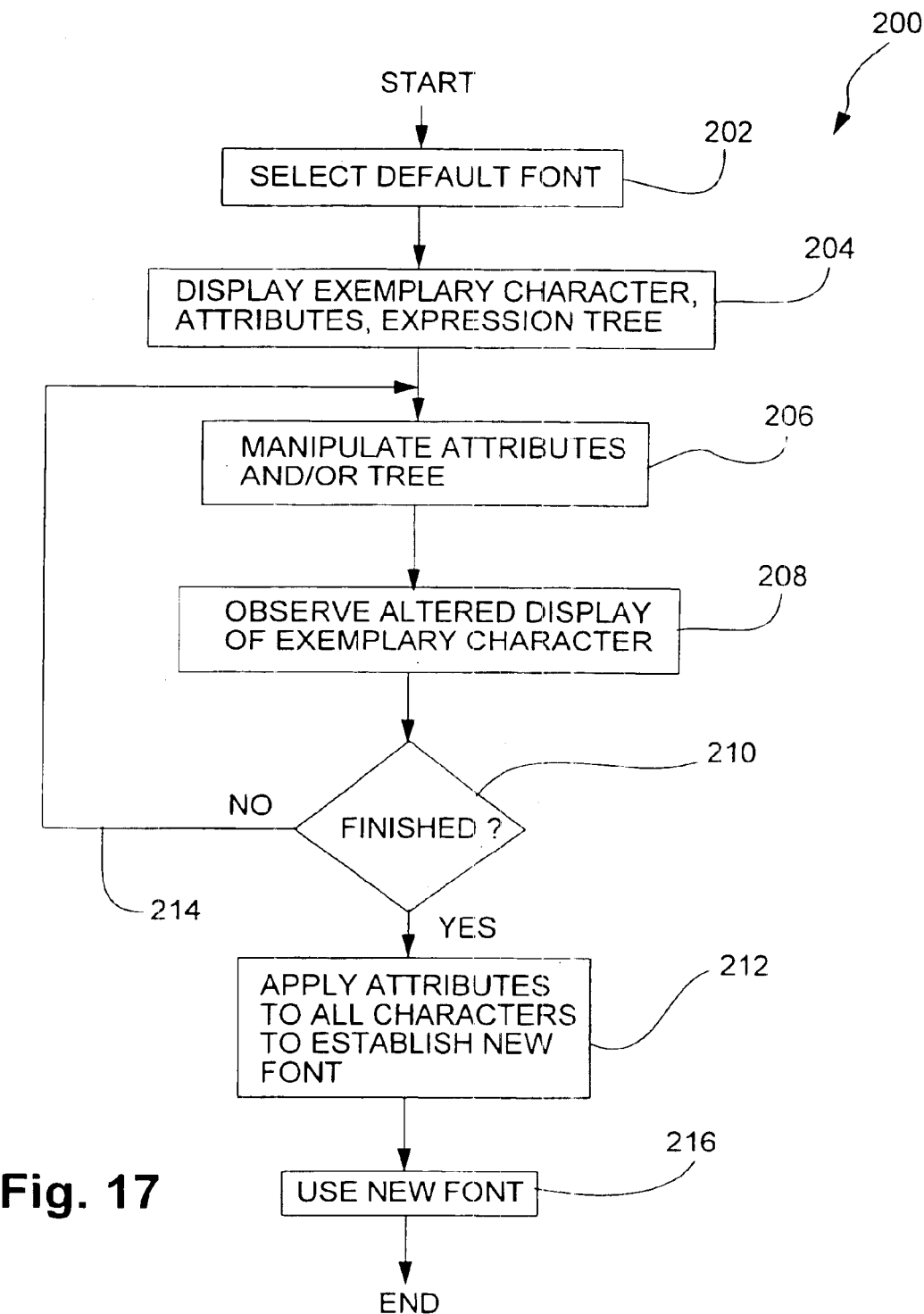
FIG. 17 is a flowchart of the font creation process according to the preferred embodiment.

Font creation be achieved in a number of ways, one of which will now be described with reference to FIGS. 13, 16 and 17. In this preferred embodiment an application program running from the hard disk 159 of the computer system 150 implements a method 200 which initially prompts the user to select a default font at step 202. This may, for example as shown in FIG. 13 results in the selection of the Times New Roman Font. The system then acts to display an exemplary character and its corresponding attributes and expression tree in the windows 114, 116 and 119 respectively at step 204. Having presented the default font, the user may then manipulate the attributes 117 within the window 116 and/or the expression tree 120 to achieve a desired visual effect. Preferably, as manipulation occurs, the altered font is updated in the window 114 permitting the user to observe the amendments, this being step 208. If the user is not satisfied with the altered font displayed by the exemplary character, the method permits a return via path 214 to step 206 where further manipulation may take place. If satisfied, in step 212 the user acknowledges the new font which is then applied to all characters within the corresponding character set. In the illustrated example, the outline shape off the Times New Roman character set is not altered, but the color fill of the characters within the set is changed to reproduce a textured image over which are composited an arrangement of balls, as described above. The new character set is then made available for general use at step 216, and this may include any one or more of a plethora of uses of the font, for example to alter the text within a word processing document, or to create a banner over a document displayed in a conventional font. The windows 110, 114, 116 and 119 are preferably displayed on the video display 154 of the computer system 150 and the new font may be stored for use on the hard disk 159 for example. Alternatively the new font may be used directly with the printing of the desired document or made available to other computers via the computer network. The default font need not be a traditional font as such, but may incorporate a data format corresponding to the new architecture described above which thus permits corresponding new fonts to be supplied to the computer system 150, either via the network or by floppy disk for example. The user may then use those new fonts directly in documents or alternatively amend the new fonts in the manner described above to produce further fonts.

It would be appreciated by a person skilled in the art that numerous variations and/or modifications may be made to the present invention as shown in the specific embodiments without departing from the spirit or scope of the invention as broadly described. The described embodiments are, therefore, to be considered in all respects to be illustrative and not restrictive.

What is claimed is:

1. A method of forming characters from a font for reproduction, the font containing a plurality of glyphs, the method comprising the steps of:
    (a) obtaining a description of one or more of the glyphs from the font;
    (b) combining components of the description of at least one of the glyphs using compositing operators, wherein the compositing operators operate on at least one component and the components are selected from a group consisting of shapes and images; and
    (c) rendering the characters for reproduction using the combined components.

2. A method according to claim 1, wherein the components of the glyphs are organized into a graph data structure.

3. A method according to claim 2, wherein the components of the glyphs are organized into a hierarchical structure.

4. A method according to claim 3, wherein the components of the glyphs are organized into a tree structure.

5. A method according to claim 1, wherein visual features of the glyphs depend on one or more parameters, the parameters being set to:
    (a) predetermined values of the font; or
    (b) values determined by a user of the font who has overridden the predetermined values.

6. A method according to claim 1, wherein the compositing operators utilize transparency values associated with the components of the description in forming an appearance of a glyph.

7. A method according to claim 1, wherein the compositing operator applied to a plurality of the components performs a selection of one of the components during rendering, a determinant of the selection being chosen by the user of the font.

8. A method according to claim 1, wherein a compositing operator acting on two components performs an operation on at least one of color and transparency values, the operator being selected from the group consisting of OVER, IN, OUT, ATOP, XOR, PLUS, MINUS, NOT-XOR, AND, NAND, OR, NOR, NOT, CLEAR, SET, and COPY.

9. A method according to claim 1, wherein at least one of the compositing operators acting on a single component performs a mapping of the color(s) of the component during rendering, a determinant of the mapping being a characteristic of the font.

10. A method according to claim 1, wherein a component of the description contains the shape of an outline.

11. A method according to claim 10, wherein the outline is one of:
    (a) filled;
    (b) stroked using a particular type of stroke style; or
    (c) both filled and stroked.

12. A method according to claim 1, wherein the component of the glyph contains data required to represent a natural or synthesized image, and the image contains color pixel values in any gamut recognizable by the rendering process.

13. A method according to claim 1, wherein the glyph contains characteristics that apply to one or more of the components of the glyph, the characteristics including:
    (a) color of the components,
    (b) amount of the transparency,
    (c) method used to fill the shapes,
    (d) width of line stroking of a shape,
    (e) style of a shape of a join where two lines meet,
    (f) style of a cap on an end of a line,
    (g) limit on length of a mitre when a mitered join is present, and
    (h) style of a dash pattern that may be applied to an outline of a shape.

14. A method according to claim 1, wherein the components of the description of the at least one glyph comprise a shape of another glyph taken from another font.

15. A method according to claim 1, wherein said rendering step (c) comprises rendering the characters onto a display medium.

16. A method according to claim 1, wherein said rendering step (c) comprises printing the characters as part of a document.

17. A method of creating a series of font characters on a computer system comprising the steps of:

provided a series of font outlines and source artwork;

providing a series of manipulation tools for the manipulation, by a user of the computer system, of aspects of the outlines and artwork, the manipulation tools being selected from the group consisting of (a) tools for distorting, replacing or compositing the outline of a font, (b) tools for application of morphological effects to the font outlines, and (c) tools for application of non-morphological effects to the font outlines;

providing for the creation of substantially arbitrarily complex font structures from the outlines, artwork and manipulation tools; and creating the series of font characters through the application of the complex font structures to each of a base font outline in the series of font characters.

18. A method according to claim 17, wherein the complex font structures comprise a graphical expression tree of operations to be performed in the creation of a font.

19. A method according to claim 18, wherein the graphical expression tree includes an outline of a font.

20. Apparatus for creating a series of font characters on a computer system, the apparatus comprising:

means for providing a series of font outlines and source artwork;

means for providing a series of manipulation tools for the manipulation by a user of the computer system, of aspects of the outlines and artwork, said manipulation tools being selected from the group consisting of (a) tools for distorting, replacing or compositing the outline of a font, (b) tools for application of morphological effects to the font outlines, and (c) tools for application of non-morphological effects to the font outlines;

means for creating substantially arbitrarily complex font structures from the outlines, artwork and manipulation tools; and means for creating the series of font characters through the application of the complex font structures to each of a base font outline in the series of font characters.

21. A method of creating a font for a plurality of reproducible characters, said method including the steps of:

(a) providing a plurality of glyphs which together define outlines of the characters having shape characteristics of the font;

(b) establishing a plurality of records of font attributes, the font attributes including characteristics of reproduction of the outlines and filling material for reproduction in association within the outlines;

(c) associating first selected ones of the records with second selected ones of the glyphs; and (d) manipulating the first selected records to alter a reproduction of the second selected glyphs and hence characters reproduced therefrom, the manipulation including altering at least one of color, an opacity, a stroke width, a continuity of a stroke, a shape of a glyph, and a joining between any two glyphs.

22. A method according to claim 21, wherein step (a) includes providing a plurality of default glyphs associated with a font having first shape characteristics and step (d) includes manipulating the default glyphs to form a further font having second shape characteristics.

23. A method according to claim 21, wherein step (b) includes providing a plurality of default attributes associated with the filling material of a font having first fill characteristics and step (d) includes manipulating the default attributes of the filling material to form a further font having second fill characteristics.

24. A method according to claim 23, wherein the step of manipulating the filling material includes altering at least one of a color and an opacity of the filling material.

25. A method according to claim 24, wherein the altering includes forming a blend between glyphs.

26. A method according to claim 25, wherein the altering includes compositing colors together to form an image within the filling material.

27. A method according to claim 21, wherein outlines and filling material for each character in the font are defined by at least one graphical expression tree including at least one operator acting upon at least one of the font attributes and the character is reproducible by rendering the expression tree.

28. A method according to claim 27, wherein one of the font attributes includes a predefined image, the predefined image being at least one of a pixel-data image or a graphic object image.

29. A method according to claim 21, wherein the attributes are selected from the group consisting of color, opacity, draw style, stroke width, line joining style, line cap style, mitre limit, dash pattern and choice number.

30. A method according to claim 29, wherein the choice number is used to augment the font with image data.

31. A method of manipulating a font having a plurality of reproducible characters in a computer system, the font being described by a plurality of glyphs each of which contribute to at least a shape of one of the characters, and each glyph of the plurality of glyphs having a plurality of attributes which contribute to a reproduction of the glyph in corresponding ones of the characters, the attributes being alterable to thereby modify a reproduction of the glyph in the corresponding characters, said method comprising the steps of:

(a) retrieving data corresponding to a predetermined default font and characters associated therewith including corresponding the glyphs and attributes;

(b) manipulating selected ones of the attributes associated with selected ones of the glyphs to alter the default font to provide a second font; and (c) reproducing at least one character of the second font.

32. A method according to claim 31, wherein step (a) includes reproducing in a first manner at least one character of the default font, and step (b) includes interactively altering the default font and reproducing the altered font in the first manner until a final font is formed, and step (c) includes reproducing the final font in a second manner.

33. A method according to claim 32, wherein reproducing in the first manner includes displaying the character on a video display associated with the computer system.

34. A method according to claim 32, wherein reproducing in the second manner includes at least one of displaying the character on a video display associated with the computer system, printing the character with a printer associated with the system, or recording the character in a form suitable for subsequent reproduction.

35. A computer readable medium incorporating a computer program product having series of instructions interpretable by a computer for creating a font for a plurality of characters, said medium including:

means for providing a plurality of glyphs which together define outlines of the characters having shape characteristics of the font;

means for establishing a plurality of records of font attributes, the font attributes including characteristics of reproduction of the outlines and filling material for reproduction in association within the outlines;

means for associating first selected ones of the records with second selected ones of the glyphs; and means for manipulating the first selected records to alter a reproduction of the second selected glyphs and hence characters reproduced therefrom, the manipulation including altering at least one of a color, an opacity, a stroke width, a continuity of a stroke, a shape of a glyph, and a joining between any two glyphs.

36. Apparatus for creating a font for a plurality of characters, said apparatus comprising:

means for providing a plurality of glyphs which together define outlines of the characters having shape characteristics of the font;

means for establishing a plurality of records of font attributes, the font attributes including characteristics of reproduction of the outlines and filling material for reproduction in association within the outlines;

means for associating first selected ones of the records with second selected ones of the glyphs; and means for manipulating said first selected records to alter a reproduction of the second selected glyphs and hence characters reproduced therefrom, the manipulation including altering at least one of a color, an opacity, a stroke width, a continuity of a stroke, a shape of a glyph, and a joining between any two glyphs.

37. A computer program product comprising a computer readable medium having a computer program recorded thereon for forming characters from a font for reproduction, the font containing a plurality of glyphs, said computer program product comprising:

(a) computer program code means for extracting a description of one or more of the glyphs from the font;

(b) computer program code means for combining components of the description of at least one of the glyphs using compositing operators, wherein the compositing operators operate on at least one component and the components are selected from the group comprising shapes and images; and (c) computer program code means for rendering the characters for reproduction using the combined components.

38. A computer program product comprising a computer readable medium having a computer program recorded thereon for creating a series of font characters on a computer system, said computer program product comprising:

computer program code means for providing a series of font outlines and source artwork;

computer program code means for providing a series of manipulation tools for manipulation, by a user of the computer system, of aspects of the outlines and art work, the manipulation tools being chosen from the group consisting of: (a) tools for distorting, replacing or compositing the outline of a font, (b) tools for application of morphological effects to the font outlines, and (c) tools for application of non-morphological effects to the font outlines;

computer program code means for providing for the creation of substantially arbitrarily complex font structures from the outlines, artwork and manipulation tools; and computer program code means for creating the series of font characters through the application of the complex font structures to each of a base font outline in the series of font characters.

39. A computer program product comprising a computer readable medium having a computer program recorded thereon for creating a font for a plurality of reproducible characters, said computer program product comprising:

(a) computer program code means for providing a plurality of glyphs which together define outlines of the characters having shape characteristics of the font;

(b) computer program code means for establishing a plurality of records of font attributes, the font attributes including characteristics of reproduction of the outlines and filling material for reproduction in association within the outlines;

(c) computer program code means for associating first selected ones of the records with second selected ones of the glyphs; and (d) computer program code means for manipulating the first selected records to alter reproduction of the second selected glyphs and hence characters reproduced therefrom, the manipulating including altering at least one of colour, an opacity, a stroke width, a continuity of a stroke, a shape of a glyph, and a joining between any two glyphs.

40. A computer program product comprising a computer readable medium having a computer program recorded thereon for manipulating a font having a plurality of reproducible characters in a computer system, the font being described by a plurality of glyphs, each of which contribute to at least a shape of one of the characters, each of the glyphs having a plurality of attributes which contribute to a reproduction of the glyph in corresponding ones of the characters, the attributes being alterable to thereby modify a reproduction of the glyph in the corresponding characters, said computer program product comprising:

(a) computer program code means for retrieving data corresponding to a predetermined default font and characters associated therewith including corresponding ones of the glyphs and attributes;

(b) computer program code means for manipulating selected ones of the attributes associated with selected ones of the glyphs to alter the default font to provide a second font; and (c) computer program code means for reproducing at least one character of the second font.

* * * * *